May 9, 1967
W. A. BARBER
3,318,736
FUEL CELL ELECTRODES COMPRISING CATALYST MIXTURE
OF SILVER AND MERCURY
Filed Sept. 30, 1964
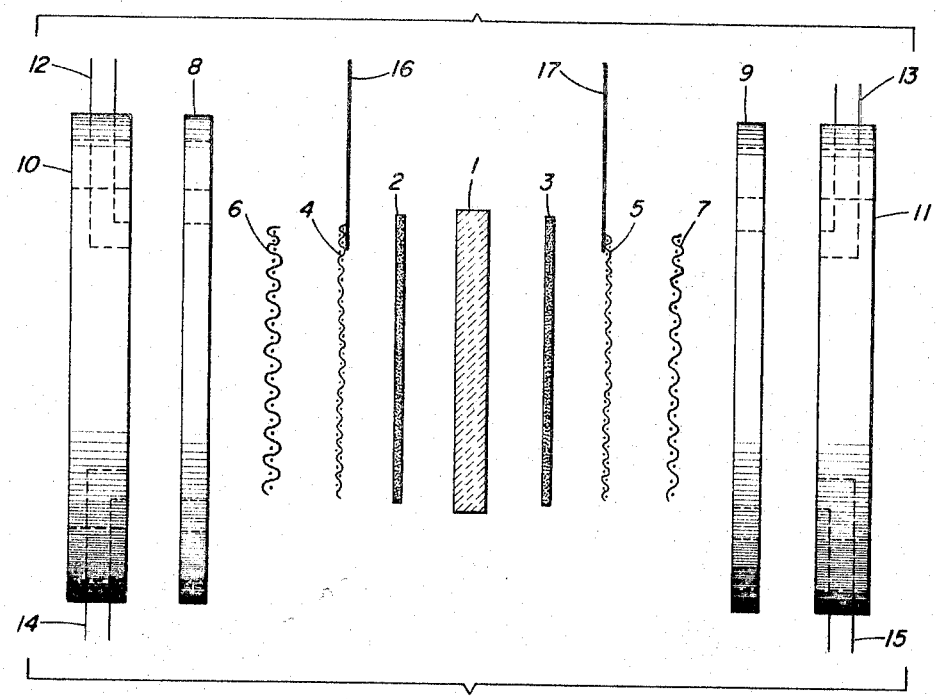
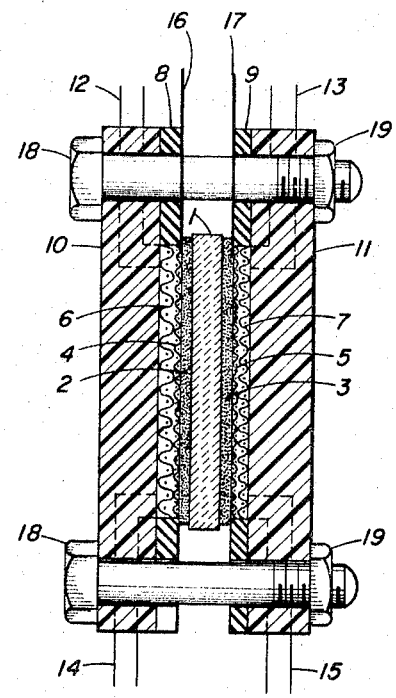
INVENTOR.
WILLIAM AUSTIN BARBER
BY
*Harry K. Kline*
ATTORNEY

United States Patent Office 3,318,736
Patented May 9, 1967

3,318,736
FUEL CELL ELECTRODES COMPRISING CATALYST MIXTURE OF SILVER AND MERCURY
William Austin Barber, Stamford, Conn., assignor to American Cyanamid Company, Stamford, Conn., a corporation of Maine
Filed Sept. 30, 1964, Ser. No. 416,948
4 Claims. (Cl. 136—86)

This application is a continuation-in-part of my parent application for U.S. Letters Patent, Ser. No. 370,869, filed on May 28, 1964, now abandoned.

The present invention relates to a novel catalytic oxygen electrode eminently suitable for use in a variety of fuel cells, such as hydrogen-oxygen, hydrazine-oxygen and ammonia-oxygen fuel cells. More particularly, it relates to a novel catalytic oxygen electrode comprising a mixture of silver and mercury useful in fuel cells operative in alkaline media over a prolonged period of time.

It is known that various non-noble metallic catalysts in formed electrodes can be utilized in alkaline or basic fuel cells. Unfortunately, such electrodes cannot be widely used as oxygen electrodes in that such fuel cells operating with non-noble electrodes perform rather poorly with increasing current densities and attendant decrease in voltage. However, where noble catalysts are employed as oxygen electrodes, relatively large catalyst loadings are required with substantial increase in cost, rendering their use commercially unattractive.

It is, therefore, a principal object of the present invention to provide a formed, relatively inexpensive oxygen electrode which permits a basic fuel cell to operate at both high voltage and high current density. A further object is to provide a straightforward method for preparing such enhanced oxygen electrodes supported on either a metallic or a non-metallic substrate. A still further object is to provide an improved basic fuel cell employing the hereinbelow-defined catalytic electrodes. These and other advantages will become apparent from a consideration of the ensuing detailed description.

To this end, it has been unexpectedly found that a mixture of silver and mercury in amounts hereinbelow defined enhances an electrode prepared therefrom to an extent hitherto unknown. While it is known that metallic silver may be employed as the catalytic material of the cell, metallic mercury is of little value, if at all, in such an environment. Surprisingly, the utilization of a mixture of such metals substantially enhances the electrode in contradistinction to the use of silver alone.

According to the process of the invention, the catalyst suitable for use as an oxygen electrode for a fuel cell utilizing an alkaline electrolyte can be prepared by two principal procedures. One method involves the coprecipitation of a mixture of a silver salt, such as silver nitrate or silver chlorate, and a mercury salt, such as mercuric nitrate or mercuric chloride, in the presence of an alkaline reagent as, for instance, sodium hydroxide, potassium hydroxide or the like. The coprecipitated catalysts may be combined with binder-waterproofing agents, such as polytetrafluoroethylene, polychlorotrifluoroethylene as well as polyethylene per se, to form a paste. In a second procedure, a mixture of silver oxide and mercuric oxide can be initially admixed physically. In general, the ratio of silver to mercury on a weight basis is established between 1:0.2 and 1:1.5, respectively. For optimum performance, a weight ratio of silver to mercury of 1:0.5–1, respectively, should be maintained.

A supporting grid or screen may advantageously be employed to receive the foregoing catalyst mixture. The grid material to be used is chosen for its ability to withstand the corrosive condition which exists in the particular alkaline or basic electrolyte system. Illustrative of a suitable grid is: stainless steel, nickel or asbestos.

As a final operation in the electrode forming process, it is preferred to spread the catalyst paste on the screen or grid and then drying the resultant structure. The latter is then subjected to reduction with, for example, sodium borohydride or potassium borohydride.

The membrane separating the electrodes of the fuel cell can be any impervious membrane saturated with base electrolyte. Ordinary filter paper, asbestos fiber paper as well as polymer membranes containing ion exchange materials can be used. The latter material may also be used in either a leached or water-equilibrated state. For illustrative purposes, ordinary filter paper saturated in 5 N or 8 N potassium hydroxide is employed herein as the separating membrane.

In general, fuel cells hereinbelow defined and which fall within the purview of the present invention comprise three essential elements: base electrolyte, electrodes or electrocatalysts, one of which comprises the electrode of the present invention, and current collectors. Suitable collectors can be perforated, or corrugated plates or metallic screens and equivalents thereof.

In order to further clarify the invention, these and other embodiments thereof are shown in the accompanying drawing and will be described in detail in conjunction with said drawing.

In the drawing:
FIGURE 1 is an exploded plan view, partially in section, of a fuel cell employing the electrode of the present invention.
FIGURE 2 is a partially expanded side view, partially in section, of the fuel cell of FIGURE 1.

In FIGURE 1, a 5 N potassium hydroxide saturated filter paper membrane 1 is positioned between a fuel electrode 2 such as platinum, palladium, nickel or rhodium and an oxygen electrode 3, of the invention. Abutting the latter electrodes are current collector screens 4 and 5 which comprise nickel or other suitable inert metal. Nickel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as silicone rubber. These seal as well as separate the chambers containing reactants. Exterior to the gaskets are housing members 10 and 11 having inlet stainless steel or other inert metal tubing 12 and 13 through which hydrogen and oxygen are separately introduced into the fuel cell. Stainless steel tubing 14 and 15 are provided as vents for unused gases. Wire leads 16 and 17, connected onto current collector screens 4 and 5, are the conductive members through which current flows from and to the fuel cell through the external circuit when the fuel cell is in operation. The cell is secured by means of bolts 18 and nuts 19 as shown in FIGURE 2.

Electrodes prepared from mixtures of silver and mercury catalysts and their performance are set forth in the following examples which are merely illustrative and not to be taken as limitative of the invention. Further, each of the examples incorporate the fuel cell defined by the above drawing. Unless otherwise stated, the parts are by weight.

*Example 1*

Equal parts by weight of silver nitrate and mercuric nitrate are dissolved in water. A codeposited silver oxide and mercuric oxide mixture ($Ag_2O$–$HgO$) is prepared by precipitation with excess sodium hydroxide, followed by filtration, washing and drying. The resulting dark brown oxide mixture is mixed with an aqueous dispersion of polytetrafluoroethylene and water to form a paste which is spread to the desired thickness on a 80 to 100 mesh nickel screen support and allowed to dry. The dry electrode sheet containing the silver oxide-mercuric oxide mixture is reduced with sodium borohydride to produce the silver/mercury catalyst which is then assembled as the oxygen electrode in a fuel cell as above defined.

To compare the performance of the above electrode with either a silver or mercury electrode, each of which can be similarly prepared as by forming the latter electrode with 100% silver oxide or 100% mercuric oxide powder, an inch diameter disc is cut from each of the electrode sheets and assembled separately in an hydrogen-oxygen fuel cell at 25° C. with 5 N KOH electrolyte as the oxygen electrode with an opposite, standard platinum hydrogen electrode having a loading at 9 mg. Pt/cm.$^2$. The percentage of polytetrafluoroethylene is 20% of the total material excluding support screen. Comparative data is shown in the table below.

TABLE I

| Electrode Composition | Milliamperes/cm.$^2$ at— | |
|---|---|---|
| | 0.9 volt | 0.8 volt |
| 50 mg. Ag/cm.$^2$ | 25 | 70 |
| 50 mg. Hg/cm.$^2$ | 1 | 1 |
| 100 mg./cm.$^2$ 1:1 Ag:Hg | 70 | 185 |

Substituting rhodium for the platinum fuel electrode in the above procedure, similar results are attained for the performance of the overall fuel cell.

From the above it is clear that the use of a mixture of silver and mercury is markedly superior to each of the catalyst components alone.

*Example 2*

Repeating the procedure of Example 1 in every detail except that the electrodes are tested at 70° C. The results are tabularized in Table II below.

TABLE II

| Electrode Composition | Milliamperes/cm.$^2$ at— | |
|---|---|---|
| | 0.9 volt | 0.8 volt |
| 50 mg. Ag/cm.$^2$ | 48 | 130 |
| 50 mg. Hg/cm.$^2$ | 1 | 1 |
| 100 mg./cm.$^2$ 1:1 Ag:Hg | 125 | 300 |

*Example 3*

Employing the 1:1 Ag:Hg catalyst mixture prepared as in Example 1 above, an electrode sheet is formed on an 80 mesh nickel screen support to form a finished electrode sheet containing 50 mg./cm.$^2$ of the catalyst mixture in lieu of 100 mg./cm.$^2$. An electrode cut from this sheet is assembled in the hydrogen-oxygen fuel cell as the oxygen electrode using a platinum hydrogen electrode as in Example 1. The cell is operated continuously to deliver 100 milliamperes per square centimeter at 70° C. It is noted that over a period of 1000 hours of continuous operation, the cell voltage dropped insignificantly from 0.842 to 0.832 volt.

*Example 4*

An electrode is made up following the procedure of Example 1 above except that it is initially formed from components comprising a physical mixture of commercially available silver oxide and commercially available red mercuric oxide. Resultant electrode does not perform as well as the electrode prepared by the method of Example 1. Nonetheless, it is superior as compared with either component separately. The data is shown in tabularized form below.

TABLE III

| Cell Temperature, ° C. | Milliamperes/cm.$^2$ at— | |
|---|---|---|
| | 0.9 volt | 0.8 volt |
| 25 | 32 | 90 |
| 70 | 65 | 180 |

*Example 5*

A number of codeposited mixed oxides of silver and mercury are prepared as in Example 1 from varying proportions of silver nitrate and mercury nitrate. Electrodes prepared therefrom are tested at 70° C. as oxygen electrodes in a fuel cell with 5 N KOH electrolyte. Enhanced performance is recorded in Table IV below.

TABLE IV

| Electrode Composition | Milliamperes/cm.$^2$ at— | |
|---|---|---|
| | 0.9 volt | 0.8 volt |
| 50 mg. Ag, 5 mg. Hg/cm.$^2$ | 80 | 135 |
| 50 mg. Ag, 10 mg. Hg/cm.$^2$ | 95 | 190 |
| 50 mg. Ag, 25 mg. Hg/cm.$^2$ | 145 | 350 |
| 50 mg. Ag, 50 mg. Hg/cm.$^2$ | 140 | 275 |
| 50 mg. Ag, 75 mg. Hg/cm.$^2$ | 115 | 250 |
| 50 mg. Ag/cm.$^2$ | 48 | 130 |
| 50 mg. Hg/cm.$^2$ | 1 | 1 |

I claim:

1. A fuel cell comprising in combination an oxygen electrode, said electrode consisting essentially of a grid support and a catalyst mixture of silver and mercury, the latter metals being present in a weight ratio from between about 1:0.2 and 1:1.5, respectively.

2. The fuel cell according to claim 1 wherein the catalyst consists of equal weight proportions of silver and mercury.

3. The fuel cell according to claim 1 wherein the grid support is nickel.

4. The fuel cell according to claim 1 wherein the grid support is asbestos.

References Cited by the Examiner

UNITED STATES PATENTS

| 2,319,259 | 5/1943 | Peterson | 75—173 |
| 2,767,287 | 10/1956 | Kahan | 75—169 |
| 3,020,327 | 2/1962 | Ruetschi | 136—120 |
| 3,067,276 | 12/1962 | Gruneberg et al. | 136—120 |

OTHER REFERENCES

The Journal of the Institute of Metals, 1931, vol. 46, p. 512 relied on.

WINSTON A. DOUGLAS, *Primary Examiner.*

A. SKAPARS, *Assistant Examiner.*